US006473863B1

(12) United States Patent
Genty et al.

(10) Patent No.: US 6,473,863 B1
(45) Date of Patent: Oct. 29, 2002

(54) AUTOMATIC VIRTUAL PRIVATE NETWORK INTERNET SNOOP AVOIDER

(75) Inventors: Denise Marie Genty; Gerald Francis McBrearty, both of Austin; Shawn Patrick Mullen, Buda; Johnny Meng-Han Shieh; Ramachandran Unnikrishnan, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,400

(22) Filed: Oct. 28, 1999

(51) Int. Cl.$^7$ .............................. H04L 9/00; G06F 12/14
(52) U.S. Cl. ................... 713/201; 713/162; 713/150; 709/223; 709/229
(58) Field of Search ................. 713/201, 162, 713/150; 709/223, 229

(56) References Cited

U.S. PATENT DOCUMENTS

| | | | | |
|---|---|---|---|---|
| 5,825,891 A | * | 10/1998 | Levesque et al. | 380/49 |
| 6,092,200 A | * | 7/2000 | Muniyappa et al. | 713/201 |
| 6,175,917 B1 | * | 6/2001 | Arrow et al. | 713/1 |
| 6,243,815 B1 | * | 6/2001 | Antur et al. | 713/201 |

* cited by examiner

Primary Examiner—Thomas Lee
Assistant Examiner—N C Patel
(74) Attorney, Agent, or Firm—Timothy M. Donoughue; Winstead Sechrest & Minick P.C.; Volel Emile (57) ABSTRACT

Disclosed is a system and method for enhancing the security of virtual private network (VPN) connections by automatic pre-negotiation of a secondary configuration. If snooping or other security breaches are detected, the VPN tunnel is modified automatically to the secondary pre-arranged configuration, stymieing attempted security violations.

35 Claims, 7 Drawing Sheets

AUTOMATIC VIRTUAL PRIVATE NETWORK INTERNET SNOOP AVOIDER

CROSS REFERENCE TO RELATED APPLICATION

This application relates to U.S. patent application Ser. No. 09/428,401, still pending, entitled "Manual Virtual Private Networking Internet Snoop Avoider", filed contemporaneously herewith.

TECHNICAL FIELD

The present invention relates in general to networked data processing systems, and in particular to virtual private network (VPN) systems and other network systems using tunneling or encapsulating methods.

BACKGROUND INFORMATION

A virtual private network (VPN) is an extension of a private intranet network across a public network, such as the Internet, creating a secure private connection. This effect is achieved through an encrypted private tunnel, as describe below. A VPN securely conveys information across the Internet connecting remote users, branch offices, and business partners into an extended corporate network.

Tunneling, or encapsulation, is a common technique in packet-switched networks. A packet from a first protocol is "wrapped" in a second packet from a second protocol. That is, a new header from a second protocol is attached to the first packet. The entire first packet becomes the payload of the second one. Tunneling is frequently used to carry traffic of one protocol over a network that does not support that protocol directly. For example, a Network Basic Input/Output System (NetBIOS) or Internet Packet Exchange (IPX) packet can be encapsulated in an Internet Protocol (IP) packet to carry it over a Transmission Control Protocol/Internet Protocol (TCP/IP) network. If the encapsulated first packet is encrypted, an intruder or hacker will have difficulty figuring out the true destination address of the first packet and the first packet's data contents.

The use of VPNs raises several security concerns beyond those that were present in traditional corporate intranet networks. A typical end-to-end data path might contain several machines not under the control of the corporation, for example, the Internet Service Provider (ISP) access computer, a dial-in segment, and the routers within the Internet. The path may also contain a security gateway, such as a firewall or router, that is located at the boundary between an internal segment and an external segment. The data path may also contain an internal segment which serves as a host or router, carrying a mix of intra-company and inter-company traffic. Commonly, the data path will include external segments, such as the Internet, which will carry traffic not only from the company network but also from other sources.

In this heterogeneous environment, there are many opportunities to eavesdrop, to change a datagram's contents, to mount denial-of-service (DOS) attacks, or to alter a datagram's destination address. Current encryption algorithms are not perfect, and even encrypted packets can be read given sufficient time. The use of a VPN within this environment gives a would-be intruder or hacker a fixed target to focus upon in that the end points of the VPN do not change, nor do the encryption methods and keys. The instant invention addresses the security concerns inherent in this system.

SUMMARY OF THE INVENTION

The instant invention is an apparatus and method for pre-negotiation and partial random generation of a secondary configuration of a VPN or other tunneled network for use in case the security of a main VPN is compromised. Configuration features such as the source and destination addresses of the nodes, their encryption keys, and their encryption algorithms are typically exchanged in order to establish a main VPN or tunneled network. In the instant invention, a set of usable addresses, usable encryption methods, along with randomly-generated keys are exchanged between the nodes in anticipation of a compromise of the main VPN or tunneled network. The tunneled nodes are configured to take advantage of one of the possible secondary VPN networks represented by these secondary configurations, should a compromise or attempted compromise be detected on the main VPN.

A compromise of the VPN or tunneled network may be detected through any one of several means known in the art, such as an alert from the server. In the instant invention, the secondary configurations exchanged between the nodes can be used to automatically establish a second VPN or tunneled network as the use of the main VPN or tunneled network is abandoned or fed with false data.

The foregoing outlines broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

In the following description, numerous specific details are set forth such as protocol of network transmission, byte lengths, addresses, etc., to provide a thorough understanding of the invention. However, it will be obvious to those skilled in the art that the present invention may be practiced without such specific details. In other instances, well-known circuits, computer equipment, or network facilities have been shown in block diagram form in order to not obscure the present invention in unnecessary detail. For the most part, details concerning timing considerations, specific equipment and programming languages used, encryption methods used, and the like have been omitted in as much as these details are not necessary to obtain a complete understanding of the present invention and are within the skills of persons of ordinary skill in the art.

Within the context of this description, the term "node" is intended to encompass a processing machine, such as a computer, or group of processing machines or computers, such as a local area network (LAN) or wide area network (WAN), which are electrically attached to a network system. Therefore, a "node", as used in this context, may encompass a single computer, a LAN of computers with a gateway, or a WAN of LANs with several gateways and routers. It is intended that the processing features described and attributed to a node could therefore be accomplished by a single computer, one or more computers, gateways or routers within a LAN, or one or more computers, gateways or routers within a WAN.

Within the context of this patent, the term "VPN" is intended to mean a virtual private network or any other encapsulated or tunneled networking protocol.

Figure 1:
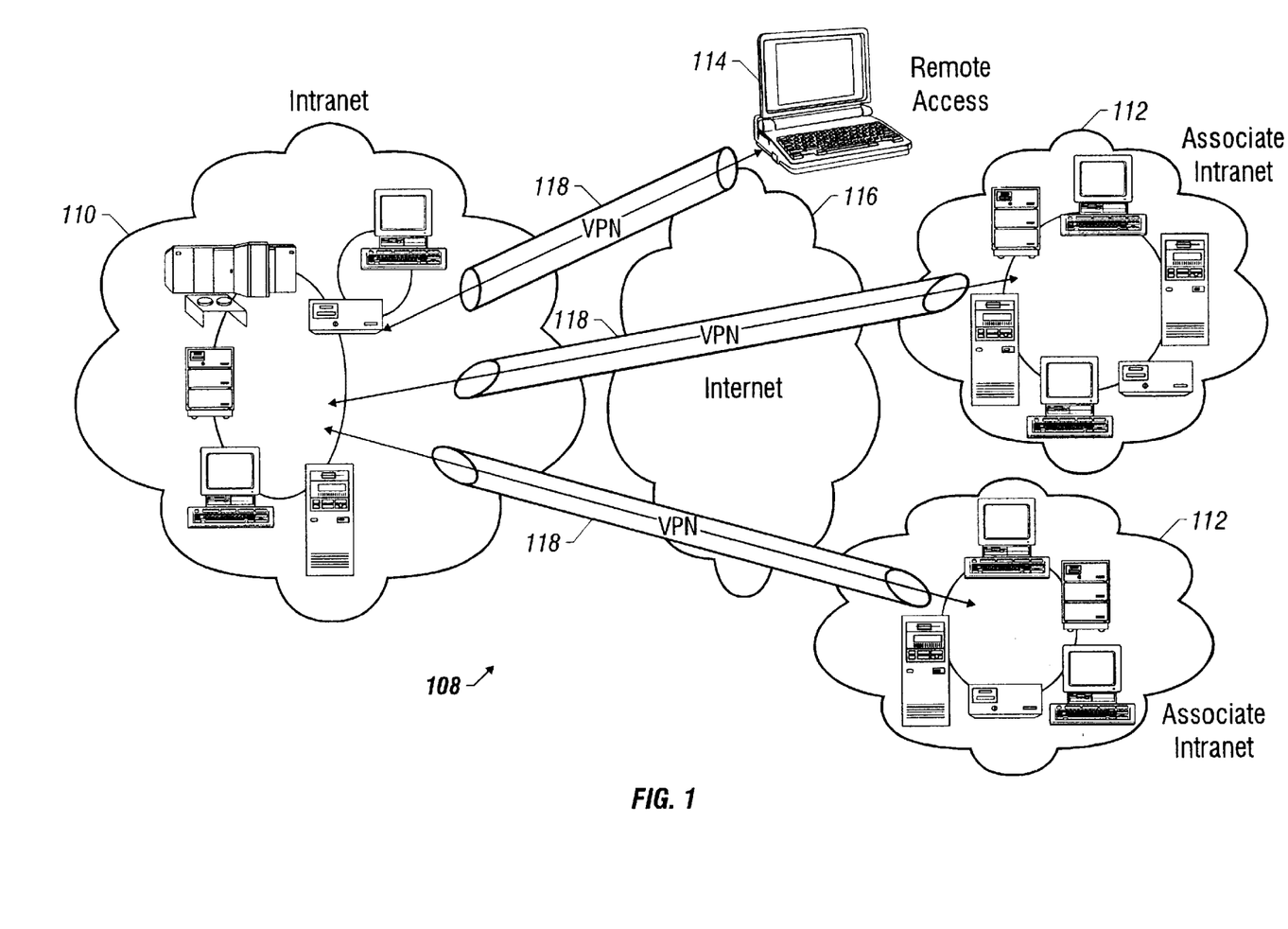
FIG. 1 is a system block diagram of a VPN network system.

FIG. 1 depicts a VPN network system 108. An intranet 110 is a system of networked computers within an organization using one or more network protocols among them for communication. A intranet 110 may be comprised of one or more local area networks (LAN), wide area networks (WAN), or a combination of the two. Oftentimes, an associate intranet 112 will need to be connected to the intranet 110. An associated intranet 112 may be a business partner, supplier, or branch office. The associate intranet 112 may also be comprised of LANs, WANS, or a combination of the two. An individual may also need to access the intranet 110 remotely, through a remote access machine 114.

In a situation where the associate intranet 112 or the remote access machine 114 are not directly connected to the intranet 110, a system may be configured using the Internet 116 to connect the intranet 110 to the associate intranet 112 and the remote access machine 114. In such a situation, the intranet 110, the associate intranet 112, and the remote access machine 114 all become nodes on the Internet 116.

It is well-appreciated within the art that the Internet 116 is comprised of a series of machines networked using a TCP/IP network protocol. While the TCP/IP network presents a universal protocol which permits a wide variety of machines to connect to the Internet 116, it raises a great many security issues. Transmissions over the Internet 116 are not secure and are subject to eavesdropping, denial-of-service (DOS) attacks, snooping, and a variety of other security breaches. Accordingly, it is widely recognized as unsafe to transmit very sensitive data over the Internet 116 without some precaution in the form of encryption. Security concerns are increased whenever consistent and systematic communications are made over the Internet 116, such as those that would be required to maintain a network connection between the intranet 110 and associate intranet 112 or remote access machine 114.

Those skilled in the art will recognize virtual private networking (VPN) as a partial solution to these problems which currently exist in the art. A VPN tunnel 118 can be defined between the intranet 110 and the associate intranet 112 or the remote access machine 114. Each of the intranet 110, the associate intranet 112, and the remote access machine 114 then become nodes to the VPN tunnel as well as the Internet 116. The VPN tunnel 118 provides an encrypted facility through the Internet 116, through which data may pass between the intranet 110 and the associate intranet 112 or remote access machine 114.

Figure 2:
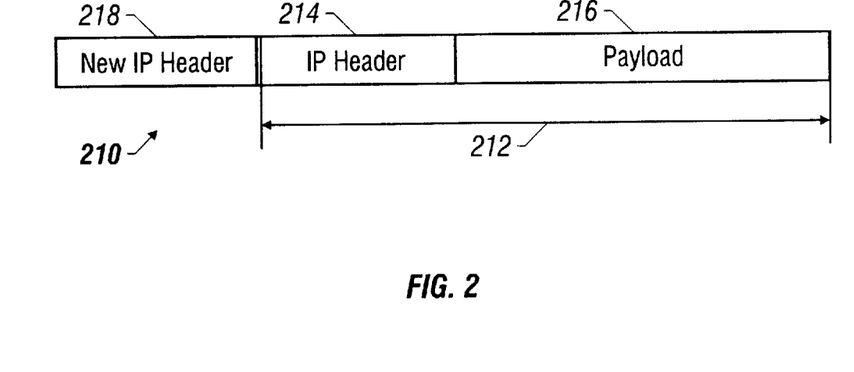
FIG. 2 is a block diagram of a packet within a VPN or tunneled network protocol.

An encapsulated packet for transmission through the VPN tunnel 118 is illustrated in FIG. 2 and an intranet packet 212 will consist of an IP Header 214 and a payload 216. The IP Header 214 is characteristic of a TCP/IP protocol, but those skilled in the art will recognize that such an encapsulation technique is frequently applied to other networking protocols within the art. The IP Header 214 contains such information as the address of the source machine, the address of the destination machine, and other administrative data. The payload 216, on the other hand, contains the data to be transmitted from the source machine to the destination machine. In a VPN network system, the original packet 212 is preceded by a new IP Header 218. The new IP Header 218 contains the same type of administrative information contained in the IP Header 214, however, the administrative information in the new IP Header 218 is such to communicate the entire packet to the end point of the VPN tunnel 118. Frequently the entire encapsulated packet 212 is encrypted before the new IP Header 218 is attached. In this way, a party who intercepts the tunneled packet cannot easily obtain any of the information from the original packet 212.

Figure 3:
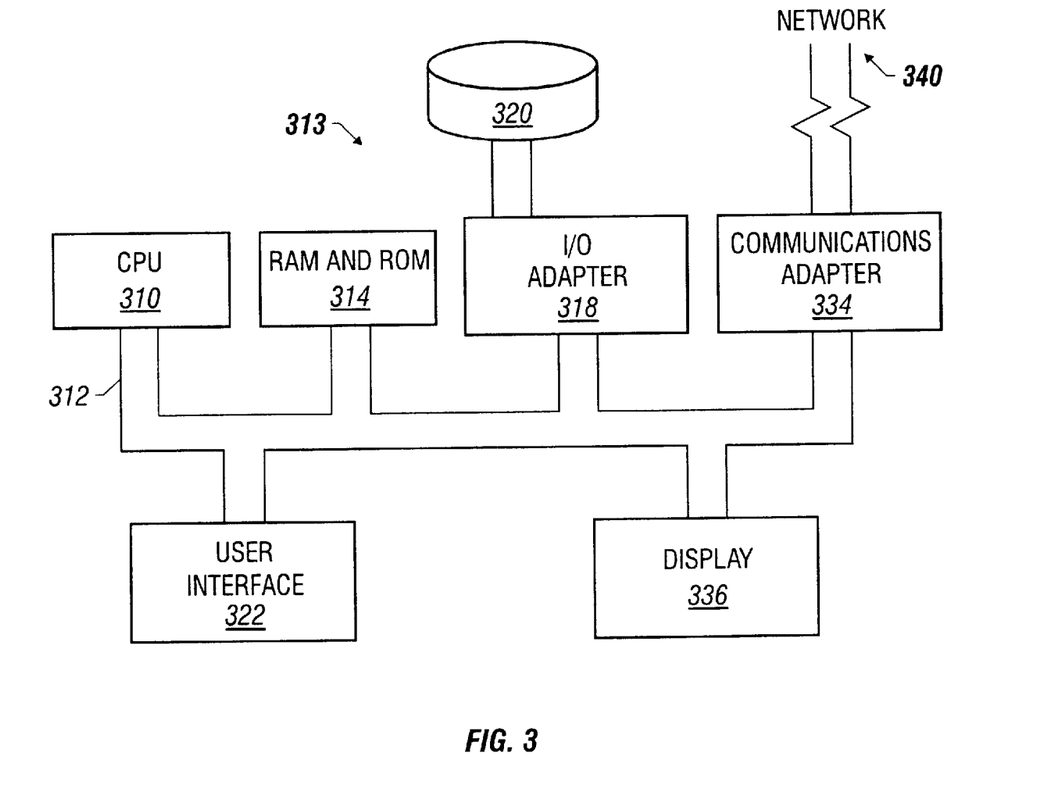
FIG. 3 is a block diagram of a computer used within a VPN network system.

A representative hardware environment for practicing the present invention is depicted in FIG. 3, which illustrates a typical hardware configuration of a data processing system 313 in accordance with the subject invention having a central processing unit (CPU) 310, such as a conventional microprocessor and a number of other units interconnected via a system bus 312. System 313 includes memory 314, consisting of random access memory (RAM) and read only memory (ROM). System 313 also includes an input/output (I/O) adapter 318 for connecting peripheral devices such as disk units 320 to the bus 312, a user interface 322 for connecting a keyboard, mouse, and/or other user interface devices (not shown) to the bus 312, a communication adapter 334 for connecting the system 313 to a data processing network, such as a LAN and/or a WAN. The system 313 may also include a displayed unit 336 for connecting a displayed device (not shown) to the bus 312. CPU 310 may include other circuitry not shown herein, which will include circuitry commonly found within a microprocessor. System 315 can be used at each of the nodes discussed previously.

The communications adapter 334 is adapted to receive data from the bus 312 and conform that data to a network protocol for transmission over the network 340. Such a protocol may be TCP/IP, NetBIOS, or a variety of other networking protocols which are common within the art. The communications adapter 334 has one or more addresses associated with it, which it can use to 'sign' outgoing packets or which it can use to determine if an incoming packet is intended for it. The communications adapter 334 may use 'aliasing' to simultaneously associate more than one address with that communications adapter 334. The data to be transmitted becomes the payload 216 previously discussed in reference to FIG. 2. The communications adapter 334 may also be adapted to receive data from the network 340 and repackage or route that data as the payload 216 of an encapsulated packet.

Figure 4:
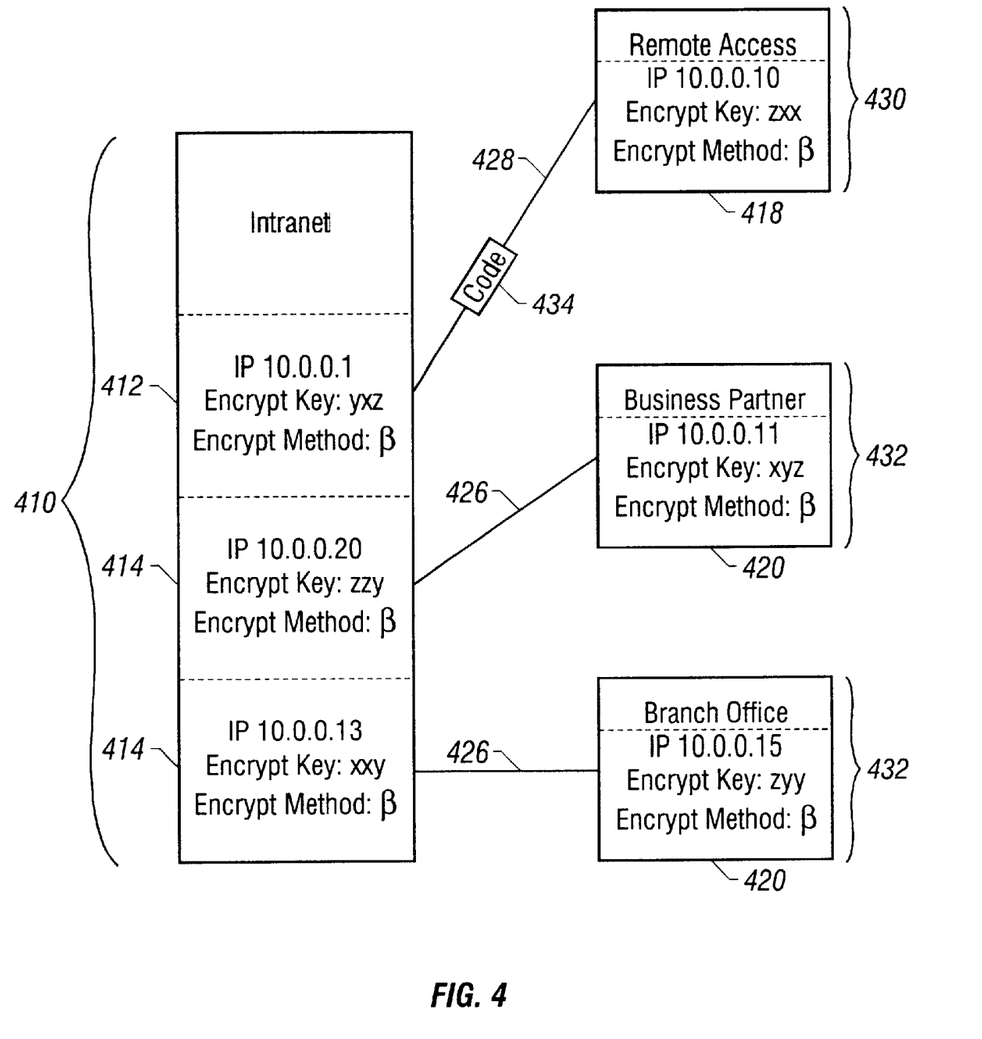
FIG. 4 is a diagram depicting the relationship of IP addresses, encryption keys, and encryption methods within a VPN network system.

The operation of the present invention is demonstrated in FIG. 4. An intranet structure 410 may have several VPN tunnel connections 412, 414. Each VPN tunnel connection 412, 414, has associated with it an IP address 430, an encryption key 432, and an encryption method 434. As is well-appreciated in the art, the IP address 430 is a unique address within the Internet 116 depicted in FIG. 1.

The encryption key 432 and the encryption method 434 can be any number of keys or methods as defined in the computer encryption art. A variety of encryption methods are available utilizing a variety of different size encryption keys 432, such that each machine has its own encryption key 432. Keys of 128-bits are common. The encryption key 432, when applied using the encryption method 434, permits the intranet structure 410 to encrypt and decrypt packets sent and received. It will be appreciated that the instant invention operates independently of the encryption keys 432 and the encryption methods 434 so that any encryption method with any number of keys may be used with the instant invention.

FIG. 4 also depicts associate intranet structures 432, each of which have an associated IP address, encryption key, and encryption method defining VPN tunnel connections 420. Likewise, a remote access structure 430 also has associated with it a remote VPN tunnel connection 418 having the same configuration information. The associate VPN tunnel connections 420 and the VPN tunnel connections 414 define a VPN tunnel 428. Likewise, the remote VPN tunnel connection 418 and the VPN tunnel connection 412 define a VPN tunnel 428.

The instant invention involves the exchange of the elements of a secondary VPN configuration, such as the IP address, encryption key, and encryption method, between an intranet structure 410 and a remote access machine 418 or associate intranet 420 immediately after a VPN tunnel 428, 426 has been established.

As addresses typically are required to be unique, the machines exchange at least one secondary address, but optimally a set of several addresses, which are or may be assigned to that machine. Likewise, the set of encryption methods supported by each machine is a fixed set, so that set of encryption methods supported is exchanged. Finally, a randomly-generated key for each encryption method is exchanged.

Once exchanged, the secondary configuration elements for the remote access machine 418 are stored by the intranet structure 410. Likewise, the intranet structure's 410 secondary configuration elements are stored on the remote access machine 418.

In the event that either the intranet structure 410 or the remote access machine 418 detects snooping or other possible security breaches along the VPN tunnel 428, the detecting machine will send a predetermined administrative change code to the other machine. The change code will designate which of the previously-exchanged secondary configuration elements are to be used. As the security of the VPN tunnel 428 may already be compromised, the change code must not include the actual secondary configuration elements. Rather, the change code should designate a code symbolizing which secondary configuration elements are to be used.

Figure 8:
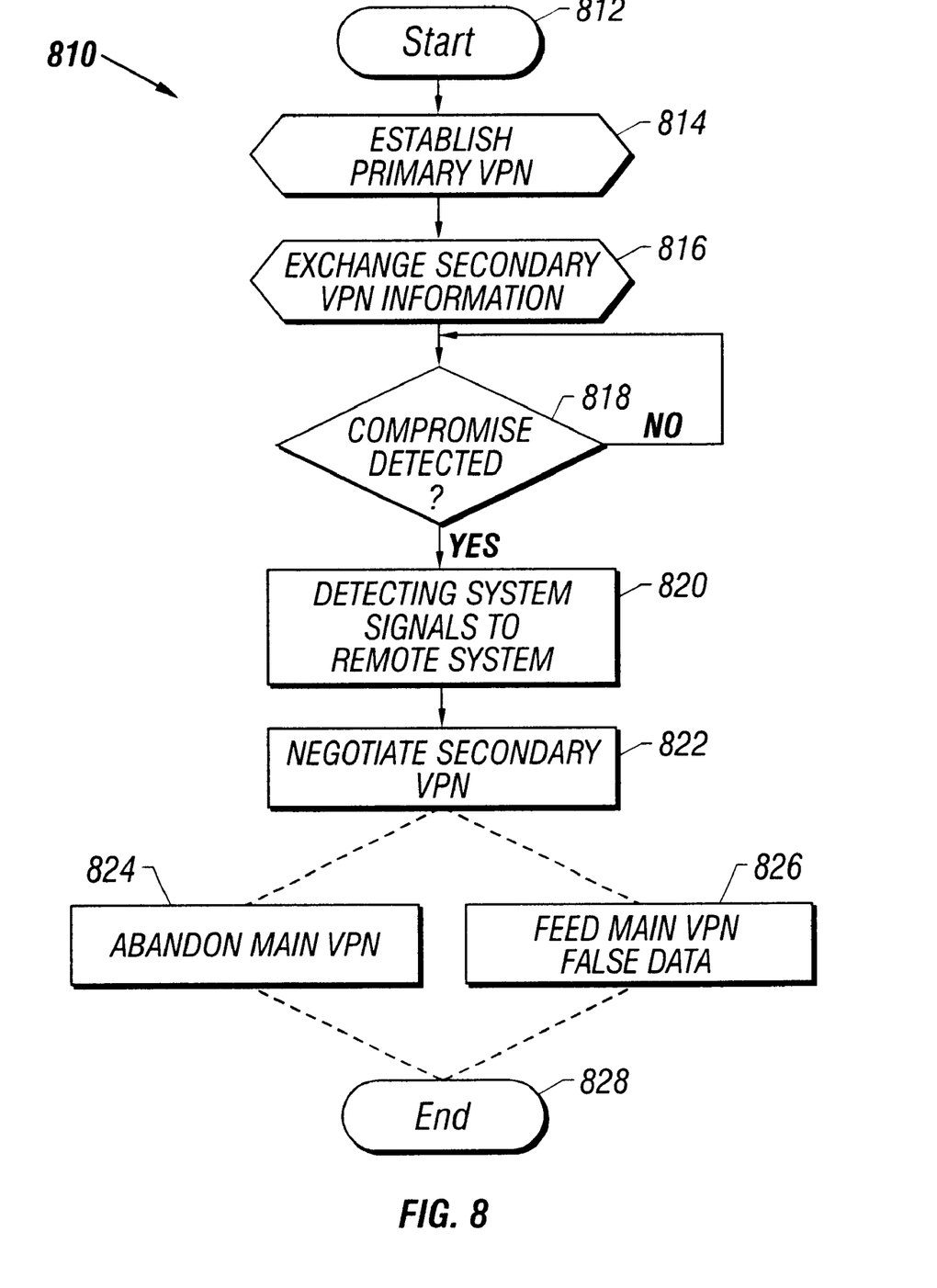
FIG. 8 is a flowchart diagram conforming to ANSI/ISO standard 5807-1985 describing the method of the present invention.

A embodiment of the method of the present invention is illustrated with reference to FIG. 8. A change algorithm 810 begins in step 812 with the precondition of a network system. A primary VPN tunnel is established in step 814 between two nodes of the network system. Then, in step 816, the nodes exchange secondary VPN configuration information. Such exchange can occur over the primary VPN tunnel previously established in step 814. The algorithm 810 then waits until a compromise is detected in step 818. As previously noted, a compromise may be a security breach or a technical failure. Upon compromise, the detecting node sends the administrative change code to the remote node in step 820. Thereupon, both the detecting and remote nodes automatically negotiate a secondary VPN tunnel in step 822.

Following establishment of the secondary VPN tunnel in step 822, the algorithm 810 may provide for either abandonment of the primary VPN tunnel in step 824 or for that primary VPN tunnel to be fed with false data in step 826. The algorithm may then be terminated in step 828, as shown, or, in an alternative embodiment, may loop to exchange additional VPN information in step 816.

Figure 5:
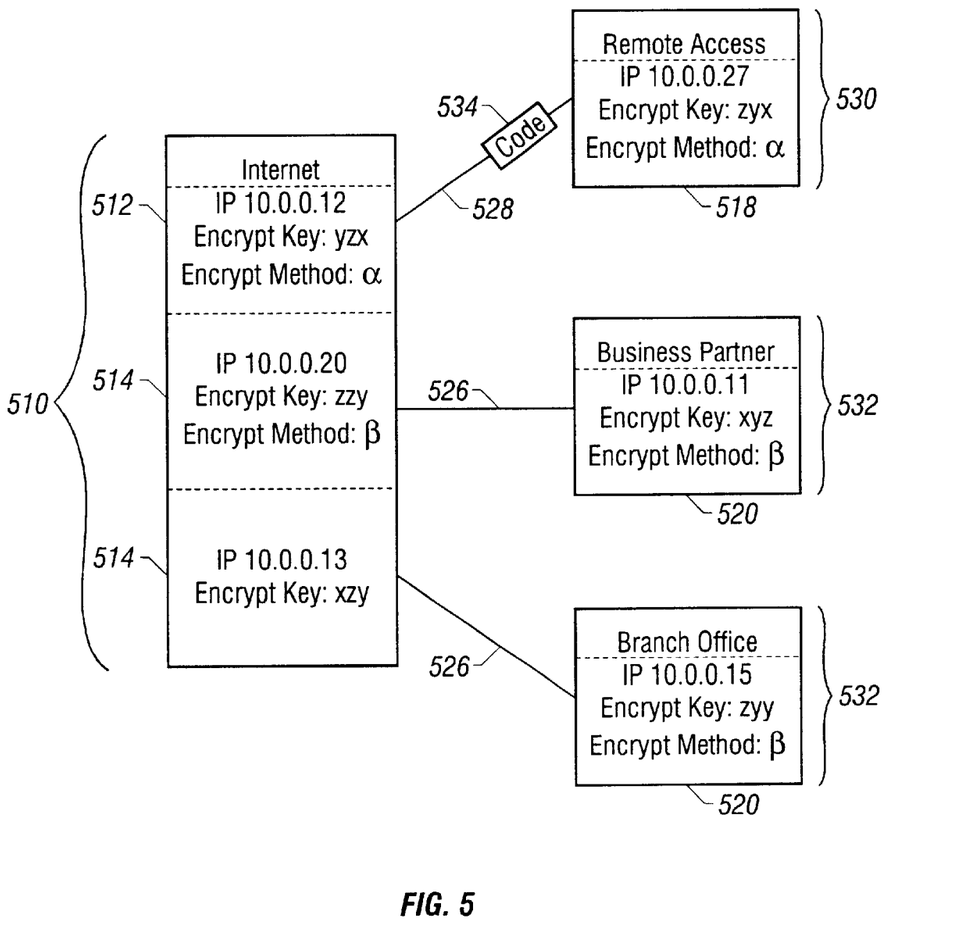
FIG. 5 is a diagram depicting the relationship of IP addresses, encryption keys, and encryption methods within a VPN network system, demonstrating a change made to the VPN network system by the instant invention.

FIG. 5 represents a possible result of an administrative change code. The intranet structure 510 has reconfigured the end of a secondary VPN tunnel 528 in accordance with the secondary configuration information 512. Likewise, the remote access machine 518 has reconfigured using the VPN configuration information previously sent to it by the intranet structure 510. As a result, the secondary VPN tunnel 528 now exists between two different IP addresses, utilizes different encryption keys, and utilizes a different encryption method. Any attempts to compromise the security of the original VPN tunnel 428 is stymied.

Figure 7:
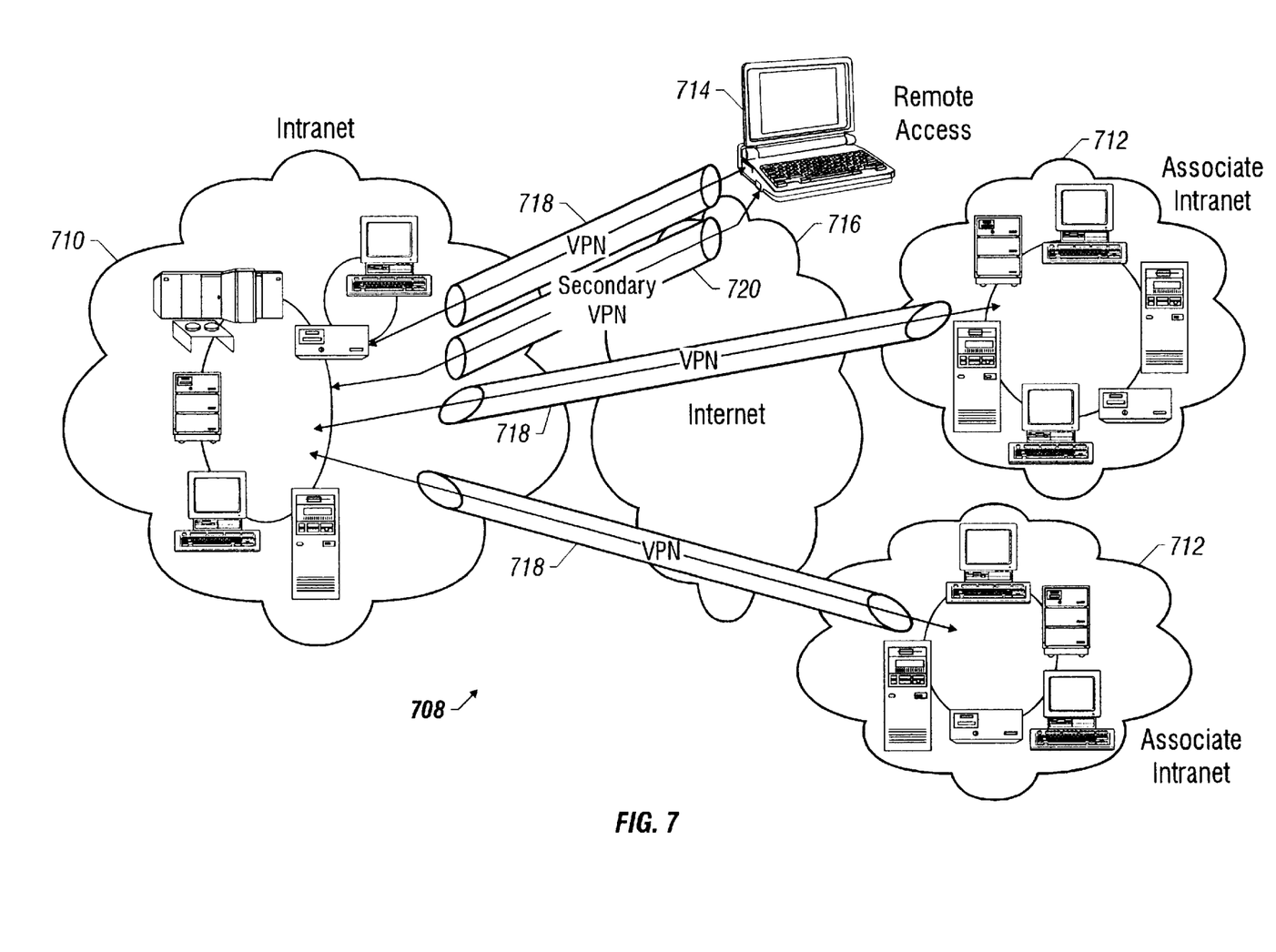
FIG. 7 is a system block diagram of a VPN network system with one of the nodes having a main and a secondary VPN tunnel in operation.

FIG. 7 illustrates the layout of the VPN network system 708 after the secondary VPN tunnel 720 begins to operate. The original VPN tunnel 718 will still be active at this point in time. Due to its compromise, however, the original VPN tunnel 718 should not be used to communicate between the intranet 710 and the remote access machine 714.

Upon establishing the secondary VPN tunnel 720, the original VPN tunnel 718 may be abandoned or fed with false data. It will also be appreciated that a single VPN tunnel may be changed without modifying other VPN tunnels within the same system 708.

The secondary configuration elements selected by the machine sending a change code may be selected by any number of algorithms, and it will be appreciated that many variations on the procedures outlined herein are possible and evident given this disclosure. In fact, the nearly infinite variety of different selection algorithms will enhance security.

Figure 6A:
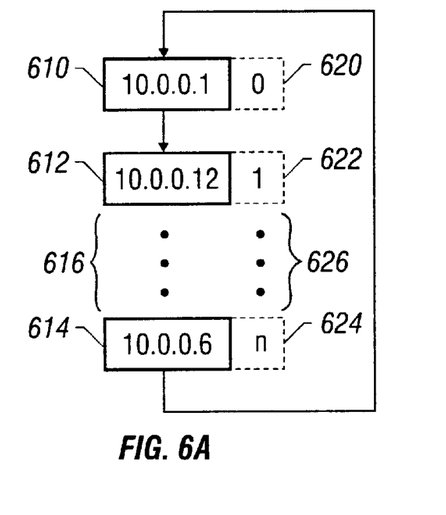
FIG. 6A is a diagram illustrating the rotation of use of a set of available IP addresses by the instant invention.

One possible algorithm for selection of addresses is demonstrated by FIG. 6A. A main VPN address 610 is ordered with a first secondary address 612, some number of additional secondary addresses 616, and a final secondary address 614. The main VPN address 610 has associated therewith a main VPN address code 620. Likewise, the first secondary address 612, the number of additional secondary addresses 616, and the final secondary address 614 also have associated therewith secondary address codes 622, 626, 624. Upon detection of a compromise, the detecting machine may simply send change code to change to the next address in order. For example, the first compromise will result in the address being changed from the main VPN address 610 to the first secondary address 612. The second compromise would cause the address to likewise shift down the ordered list of addresses until the final secondary address 614 is reached, at which time the next address selected would be the main VPN address 610 again.

In an alternate embodiment, the detecting machine may send a change code which specifies the main or secondary address code 620, 622, 626, 624 corresponding to the address to which to change. The address code specified may be determined randomly from the set of available address codes. As both nodes have the same associations of address codes to IP addresses, an identical change is made to the corresponding IP address 610, 612, 616, 614 at each node.

Figure 6B:
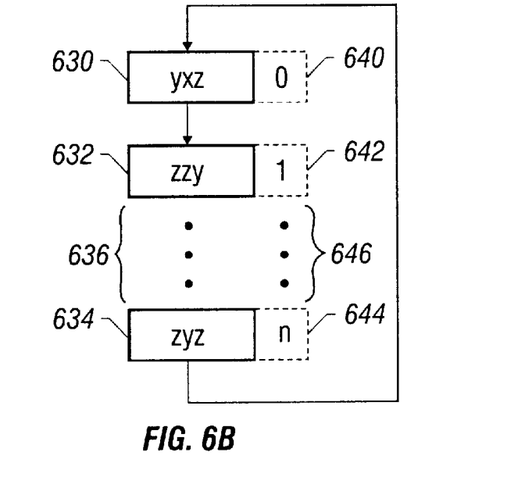
FIG. 6B is a diagram illustrating the rotation of use of a set of available encryption keys by the instant invention.
Figure 6C:
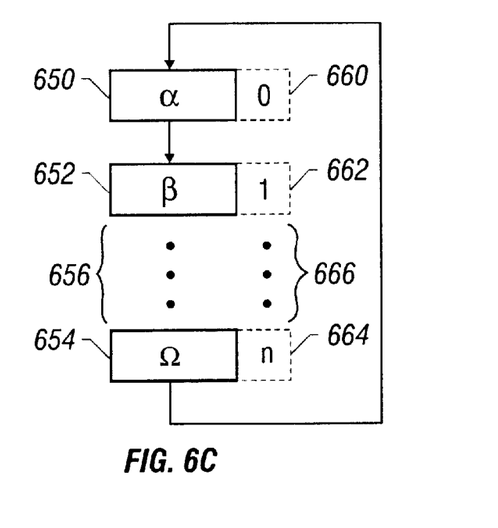
FIG. 6C is a diagram illustrating the rotation of use of a set of available encryption algorithms by the instant invention.

It will be appreciated that these same types of algorithms may be used to select from a set of useable encryption keys or encryption algorithms, as indicated in FIG. 6B and FIG. 6C, respectively. It should also be noted that alternatively encryption keys may be randomly generated and non-repeating, so that each time a key is used, a new key is generated to replace it. New keys may be exchanged immediately upon creation, when security of the VPN tunnel is assured.

Not all configuration aspects of the changing VPN tunnel 528 need change. For example, in an alternative embodiment, the addresses may be changed, leaving the encryption keys and methods the same. However, maximum security benefit will be achieved if all configuration data for the VPN tunnel 528 changes.

As to the manner of operation and use of the present invention, the same is made apparent from the foregoing discussion. With respect to the above description, it is to be realized that although embodiments of specific material are disclosed, those enabling embodiments are illustrative and the optimum relationships for the parts of the invention are to include variations in composition, form, function and manner of operation, which are deemed readily apparent to one skilled in the art in view of this disclosure. All equivalent relationships to those illustrated in the drawings encompassed in this specification are intended to be encompassed by the present invention.

Therefore, the foregoing is considered as illustrative of the principals of the invention and since numerous modifications will readily occur to those skilled in the art, it is not desired to limit the invention to the exact construction and operation shown or described, and all suitable modifications and equivalants may be resorted to, falling within the scope of the invention.

What is claimed is:

1. A tunneled networking system comprising:
   a first tunneled node having a first set of tunneling configuration data and at least one first backup configuration element associated therewith;
   a second tunneled node having a second set of tunneling configuration data and at least one second backup configuration element associated therewith; and
   a tunneled network between the first tunneled node and the second tunneled node,
      wherein the first tunneled node is operable to select a selected first backup configuration element from the set of first backup configuration elements, send a change code to the second tunneled node, and begin using the selected first backup configuration element to negotiate a backup tunneled network with the second tunneled node, and
      the second tunneled node is operable to receive the change code and interpret the change code to select a selected second backup configuration element from the set of second backup configuration elements, and begin using the selected second backup configuration element to negotiate the backup tunneled network with the first tunneled node.

2. The tunneled networking system of claim 1 wherein the first tunneled node is further operable to detect compromises of the tunneled network and send the change code upon detection of a compromise of the tunneled network.

3. The tunneled networking system of claim 2 wherein the compromise is a security compromise.

4. The tunneled networking system of claim 2 wherein the second tunneled node is operable to send an acknowledgment code to the first tunneled node upon receipt of the change code, and
   wherein the first tunneled node is operable to receive the acknowledgment code from the second tunneled node prior to attempting to negotiate the backup tunneled network.

5. The tunneled networking system of claim 2 wherein the first set of networking configuration data is comprised of a source address, a destination address, at least one first encryption key, and an encryption method, and
   wherein the second set of networking configuration data is comprised of the source address, the destination address, at least one second encryption key, and the encryption method.

6. The tunneled networking system of claim 5 wherein the first backup configuration element is at least one of the set of an address, an encryption key, and an encryption method, and
   wherein the second backup configuration element is at least one of the set of an address, an encryption key, and an encryption method.

7. The tunneled network system of claim 2 wherein the first tunneled node is operable to abandon the network tunnel after sending the change code, and
   the second tunneled node is operable to abandon the network tunnel after receiving the change code.

8. The tunneled network system of claim 2 wherein the first tunneled node is operable to send false data over the network tunnel after sending the change code, and
   the second tunneled node is operable to send false data over the network tunnel after receiving the change code.

9. The tunneled network system of claim 4 further comprising
   at least one additional tunneled node having an additional set of tunneling configuration data and at least one additional backup configuration element associated therewith,
      wherein the network tunnel further connects the first tunneled node and the second tunneled node to the additional tunneled node,
      the additional tunneled node being operable to receive the change code and interpret the change code to select a selected additional backup configuration element from the set of additional backup configuration elements, and begin using the selected additional backup configuration element to negotiate the backup tunneled network with the first tunneled node and the second tunneled node, and
      wherein the first tunneled node is further operable to receive the acknowledgment code from the additional tunneled node prior to attempting to negotiate the backup tunneled network.

10. In a tunneled network system having a first tunneled node and a second tunneled node, a method comprising the steps of:
   associating a first set of tunneling configuration data and at least one first backup configuration element with the first tunneled node;
   associating a second set of tunneling configuration data and at least one second backup configuration element with the second tunneled node;
   the first tunneled node selecting at least one selected first backup element from the at least one first backup configuration element;

the second tunneled node selecting at least one selected second backup element from the at least one second backup configuration element; and the first tunneled node and the second tunneled node negotiating a second tunneled network system using the at least one selected first backup element and the at least one selected second backup element.

11. The method of claim 10 further comprising the steps of:

detecting at the first tunneled node a potential compromise within the tunneled network system; and the first tunneled node alerting the second tunneled node to the potential compromise.

12. The method of claim 11 wherein the potential compromise is a potential security compromise.

13. The method of claim 10 further comprising the steps of:

the second tunneled node sending an acknowledgment code to the first tunneled node upon receipt of the change code; and the first tunneled node receiving the acknowledgment code from the second tunneled node prior to attempting to negotiate the second tunneled network system.

14. The method of claim 10 further comprising the steps of:

the first tunneled node abandoning the network tunnel after sending the change code; and the second tunneled node abandoning the network tunnel after receiving the change code.

15. The method of claim 10 comprising the further steps of:

the first tunneled node sending false data over the network tunnel after sending the change code; and the second tunneled node sending false data over the network tunnel after receiving the change code.

16. A tunneled networking system comprising:

a first tunneled node having a first set of tunneling configuration data and at least one first backup configuration element associated therewith;

a second tunneled node having a second set of tunneling configuration data and at least one second backup configuration element associated therewith;

a main network tunnel between the first tunneled node and the second tunneled node associated with the first set of tunneling configuration data and the second set of tunneling configuration data; and at least one backup tunnel between the first tunnel node and the second tunneled node associated with the at least one first backup configuration element and the at least one second backup configuration element, wherein the first tunneled node is operable to send a change code to the second tunneled node and begin using the backup network tunnel to communicate with the second tunneled node, and the second tunneled node is operable to receive the change code and begin using the backup network tunnel to communicate with the first tunneled node.

17. The tunneled network system of claim 16 wherein the first node is further operable to detect a compromise of the main network tunnel and send the change code upon detection of the compromise.

18. The tunneled network system of claim 17 wherein the compromise is a security compromise.

19. The tunneled networking system of claim 16 wherein the second tunneled node is operable to send an acknowledgment code to the first tunneled node upon receipt of the change code, and wherein the first tunneled node is operable to receive the acknowledgment code from the second tunneled node prior to using the backup network tunnel.

20. The tunneled networking system of claim 16 wherein the first set of networking configuration data is comprised of a source address, a destination address, at least one first encryption key, and an encryption method, and wherein the second set of networking configuration data is comprised of the source address, the destination address, at least one second encryption key, and the encryption method.

21. The tunneled network system of claim 16 wherein the first tunneled node is operable to abandon the main network tunnel after sending the change code, and the second tunneled node is operable to abandon the main network tunnel after receiving the change code.

22. The tunneled network system of claim 16 wherein the first tunneled node is operable to send false data over the main network tunnel after sending the change code, and the second tunneled node is operable to send false data over the main network tunnel after receiving the change code.

23. The tunneled network system of claim 19 further comprising:

at least one additional tunneled node having an additional set of tunneling configuration data and at least one additional backup configuration element associated therewith, wherein the main network tunnel further connects the first tunneled node and the second tunneled node to the additional tunneled node using the additional set of tunneling configuration data, and wherein the backup network tunnel further connects the first tunneled node and the second tunneled node to the additional tunneled node using the at least one additional backup configuration element, and the additional tunneled node being operable to receive the change code, send the acknowledgment code to the first tunneled node, and begin using backup network tunnel to communicate with the first tunneled node and the second tunneled node, and wherein the first tunneled node is further operable to receive the acknowledgment code from the additional tunneled node prior using the backup network tunnel.

24. A node to a tunneled networking system comprising:

a set of tunneling configuration data;

at least one set of backup configuration data; and a tunneled network endpoint, wherein the node is operable to begin using the set of backup configuration data to create a backup tunneled network endpoint.

25. The node of claim 24 wherein the node is operable to detect compromises at the tunneled network endpoint and begin using the set of backup configuration after detection of a compromise.

26. The node of claim 25 wherein the compromise is a security compromise.

27. The node of claim 25 wherein the set of tunneling configuration data is comprised of a source address, a destination address, at least one first encryption key, and an encryption method.

28. The node of claim 25 wherein the node is operable to abandon the tunneled network endpoint after establishing the backup tunneled network endpoint.

29. The node of claim 25 wherein the node is operable to send false data out the tunneled network endpoint after establishing the backup tunneled network endpoint.

30. A computer-readable medium having stored thereon a computer program comprising:
- a configuration storage code comprising a set of codes operable to direct a node to store a set of tunneling configuration data;
- a backup configuration storage code comprising a set of codes operable to direct the node to store a set of backup tunneling configuration data;
- a tunneled network endpoint code comprising a set of codes operable to direct the node to set up a tunneled network endpoint using the set of tunneling configuration data; and
- a switching code comprising a set of codes operable to direct the node to set up a backup tunneled network endpoint using the set of backup tunneling configuration data.

31. The computer-readable medium of claim 30 additionally having stored therein a computer program comprising:
- a detection code comprising a set of codes operable to direct the node to detect a compromise of the tunneled network endpoint;
- and an alert code comprising a set of codes operable to direct the node to begin execution of the switching code upon detection of the compromise.

32. The computer-readable medium of claim 31 wherein the set of tunneling configuration data is comprised of a source address, a destination address, at least one first encryption key, and an encryption method.

33. The computer-readable medium of claim 32 wherein the compromise is a security compromise.

34. The computer-readable medium of claim 32 wherein the switching code is further operable to direct the node to abandon the tunneled network endpoint after establishing the backup tunneled network endpoint.

35. The computer-readable medium of claim 32 wherein the switching code is further operable to direct the node to send false data out of the tunneled network endpoint after establishing the backup tunneled network endpoint.

* * * * *